(12) United States Patent
Falk

(10) Patent No.: US 6,691,889 B1
(45) Date of Patent: Feb. 17, 2004

(54) DEVICE AT A FUEL TANK FOR HEAVY VEHICLES AND A PROCESS OF MANUFACTURE OF THE SAID TANK

(75) Inventor: Ingemar Falk, Uddevalla (SE)

(73) Assignee: Teknikkusten AB (SE)

( * ) Notice: Subject to any disclaimer, the term of this patent is extended or adjusted under 35 U.S.C. 154(b) by 0 days.

(21) Appl. No.: 10/030,017
(22) PCT Filed: Jun. 6, 2000
(86) PCT No.: PCT/SE00/01161
§ 371 (c)(1), (2), (4) Date: Mar. 12, 2002
(87) PCT Pub. No.: WO01/00434
PCT Pub. Date: Jan. 4, 2001

(30) Foreign Application Priority Data

Jun. 29, 1999 (SE) ................................................ 9902383

(51) Int. Cl.[7] ............................................. B65D 88/12
(52) U.S. Cl. ......................... 220/563; 220/562; 220/653
(58) Field of Search ........................ 220/1.5, 562, 564, 220/563, 653, 651, 4.12, 4.14, 4.15, 4.13, 507; 280/830, 837, 838; 244/135 R

(56) References Cited

U.S. PATENT DOCUMENTS 5,704,512 A * 1/1998 Falk et al. .................. 220/501
6,412,650 B1 * 7/2002 Warner ....................... 220/4.12

FOREIGN PATENT DOCUMENTS

| EP | 0775606 | 5/1997 |
| EP | 0799739 | 10/1997 |
| EP | 0895017 | 2/1999 |

* cited by examiner

Primary Examiner—Stephen Castellano
(74) Attorney, Agent, or Firm—Orum & Roth

(57) ABSTRACT

The invention relates to an arrangement for a fuel tank for heavy vehicles. A middle section, which consists of plastic or aluminum material with an at least essentially identical transcurrent cross section in a horizontal direction viewed in the longitudinal direction, exhibits internal partitions extending horizontally in the longitudinal direction and bulkheads extending across the aforementioned partitions in the longitudinal direction. Pairs of end pieces forming end walls exhibit essentially the same profile as the circumference of the middle section and at least parts of the cross section of the partitions as end pieces which meet one another and middle sections for welding together at the respective ends of the assembled fuel tank. The partitions of the end pieces exhibit recesses forming connecting paths between the various formed sections in the middle section. Longitudinally extending recesses in the middle section are provided preferably for the purpose of receiving reinforcement and/or for suspending the fuel tank. The invention also relates to a process for the manufacture of the tank.

17 Claims, 5 Drawing Sheets

DEVICE AT A FUEL TANK FOR HEAVY VEHICLES AND A PROCESS OF MANUFACTURE OF THE SAID TANK

The present invention relates to an arrangement for a fuel tank for heavy vehicles.

Fuel tanks for heavy vehicles have special requirements and a special design compared with tanks for passenger cars. The tanks in heavy vehicles often have a volume of several hundred liters, and they can be installed in an entirely unprotected position. Today's heavy vehicles mainly have tanks made of steel or aluminium. Each in its own way possesses characteristics in respect of which an improvement would have been desirable. This is true, for example, of corrosion, manufacturing efficiency, sensitivity to external influences and weight. Previously disclosed tanks made of steel are prone to rusting, and aluminium tanks can easily buckle and become corrugated. The manufacture of tanks in plastic by the rotational moulding process has started on a limited scale, although these tanks exhibit functional limitations associated with the manufacturing method, which imposes restrictions on their possible sizes and shapes. The difficulty in fitting transverse walls poses problems with bulging long sides. All fuel tanks for heavy road vehicles with a certain internal volume are provided, or should at least be provided with internal baffle plates to reduce the dynamic mass forces during driving. These baffle plates are horizontal in all previously existing applications.

Fuel tanks made of plastic material have assumed a dominant position in the market for passenger cars. These tanks have a smaller volume, and the loading on structural components is thus significantly lower. Because of the limited volume, there is also no need for baffle plates.

It has not been possible to use thermoplastic material for heavy vehicles, due to the lack of material rigidity and the difficulty in fitting the necessary baffle plates. The external wall thicknesses required to obtain sufficient rigidity to carry the load imposed by the fuel are not practicable in production if rational methods are to be used.

Horizontal baffle plates, which are used exclusively today, have a limited effect on mass movements in a transverse direction inside the tank. Slight natural oscillations arise in the liquid inside the tank when driving on uneven roads, which in turn imposes outward and inward pumping loadings on the sides of the tank next to any baffle plates. These are dealt with today by resorting to external straps, which must be positioned solely with regard to this effect and not where it is most rational for the vehicle as a whole, i.e. the attachment points are determined by an overriding factor and cannot be optimized.

The principal object of the present invention is thus, in the first instance, among other things to solve the aforementioned problems by simple and effective means.

The aforementioned object is achieved by means of an arrangement in accordance with the present invention, which is characterized essentially in that a middle section, consisting of plastic or aluminium material with an at least essentially identical transcurrent cross section in the horizontal direction viewed in the longitudinal direction, exhibits internal partitions extending horizontally in the longitudinal direction and bulkheads extending across the aforementioned partitions in the longitudinal direction, in that pairs of end pieces forming end walls exhibit essentially the same profile as the circumference of the middle section and at least parts of the cross section of the partition as end pieces which meet one another and a middle section for welding together at the respective ends of the assembled fuel tank, and in that the partitions of the end pieces exhibit recesses forming connecting paths between the various formed sections in the middle section, in conjunction with which preferably longitudinally extending recesses in the middle section are provided for the purpose of receiving reinforcement and/or for suspending the fuel tank.

A further object of the present invention is to manufacture fuel tanks in accordance with the invention by rational and simple means.

The aforementioned further object is achieved by means of a process in accordance with the present invention, which is characterized essentially in that a partition, which consists of plastic or aluminium material with an at least essentially identical transcurrent cross section in the horizontal direction viewed in the longitudinal direction, and which exhibits internal partitions extending horizontally in the longitudinal direction and bulkheads extending across the aforementioned partitions in the longitudinal direction, is extruded and is then cut to the desired length or is injection moulded, and in that pairs of end pieces forming end walls, which exhibit essentially the same profile as the circumference of the middle section and at least parts of the cross section of the middle section as end pieces which meet one another and a middle section for welding together at the respective ends of the assembled fuel tank, and in that the partitions of the end pieces, which exhibit recesses forming connecting paths between the various formed sections in the middle section are injection moulded and are then welded together with the middle section.

The invention is described below as a number of preferred illustrative embodiments, in conjunction with which reference is made to the accompanying drawings, in which.

Figure 1:
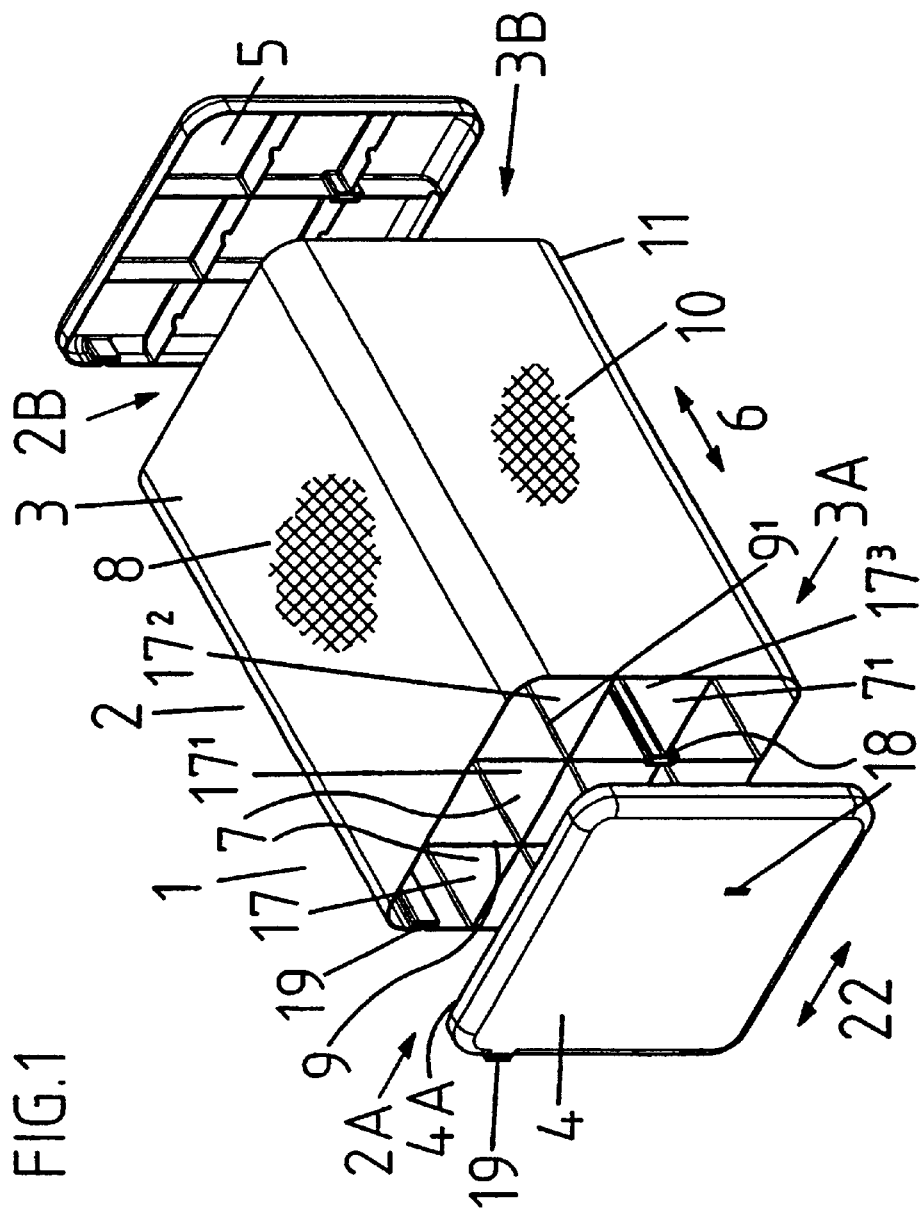
FIG. 1 shows a perspective view of the constituent parts of a fuel tank.
Figure 2:
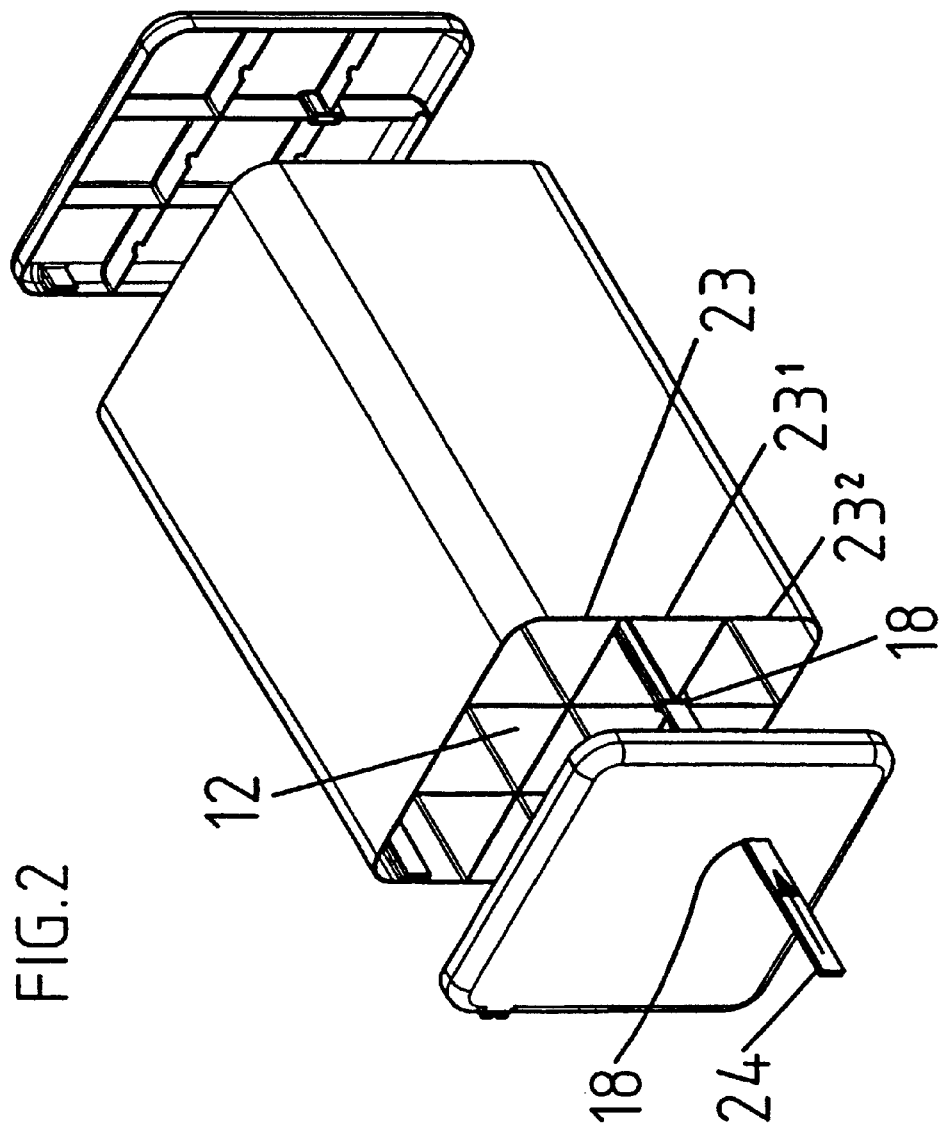
FIG. 2 shows the components in greater detail in a simple line drawing.
Figure 3:
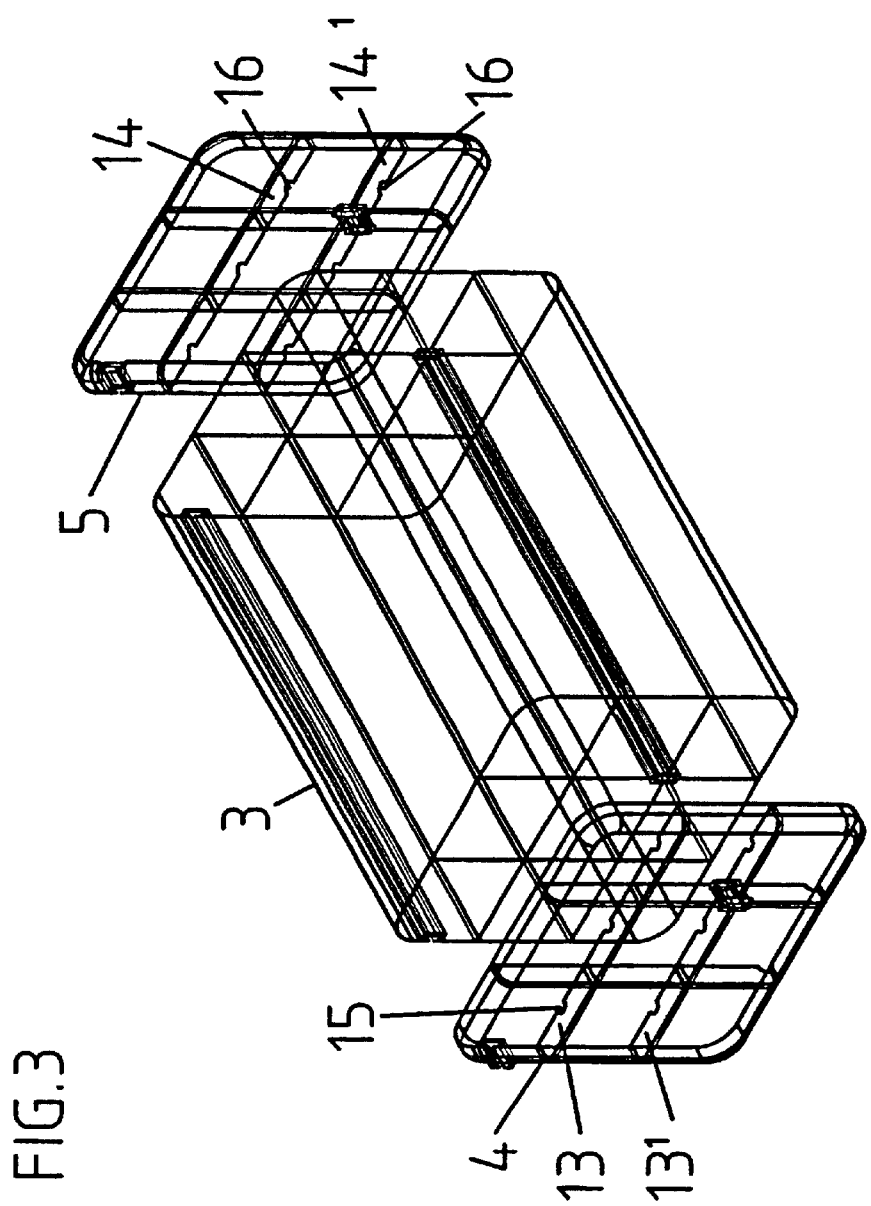
FIG. 3 shows a see-through view of the tank components.
Figure 4:
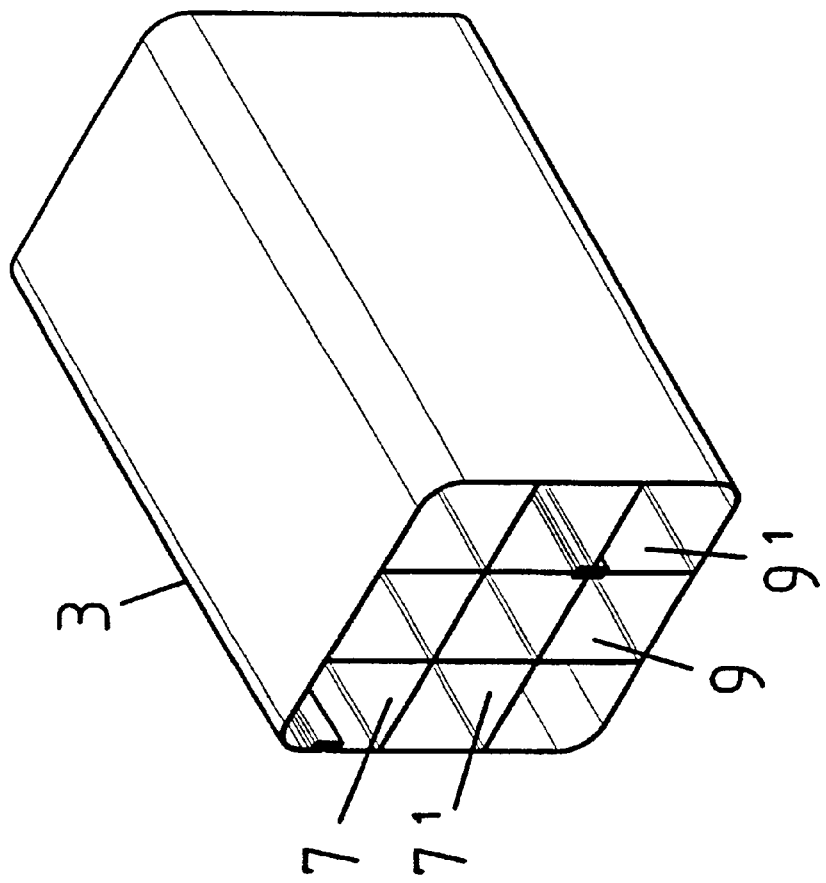
FIG. 4 shows a perspective view of only a middle section.

An arrangement 1 in accordance with the present invention applied to a fuel tank 2 of the kind in question, which is intended for heavy vehicles such as buses, mechanical loaders, heavy goods vehicles and trailers, comprises a middle section 3 and pairs of end pieces 4, 5 forming end walls which consist of a plastic or aluminium material. The middle section 3 exhibits, viewed in the longitudinal direction 6, transcurrent and at least essentially identical cross section in the horizontal direction and exhibits internally a number of partitions 7, $7^1$, which, when the tank 2 is retained in a horizontal position I, as shown in the drawings, extend horizontally along a horizontal plane 8 in the longitudinal direction. The middle section 3 also exhibits a number of bulkheads 9, $9^1$, which are so arranged as to extend across the aforementioned horizontal partitions 7, $7^1$ in the longitudinal direction 6 along a vertical plane 10.

The aforementioned pairs of end pieces 4, 5 forming end walls exhibit essentially the same profile as the circumference 11 of the middle section and at least parts of the cross section 12 of the middle section. In conjunction with this, mutually opposing end pieces 4,5 and the aforementioned middle section 3 are arranged for the purpose of being welded together with the ends 4A, 5A, 3A, 3B, in contact with one another, at the respective ends 2A, 2B of the assembled fuel tank.

The partitions 13, 13$^1$, 14, 14$^1$ of the aforementioned two end pieces exhibit recesses 15, 16, for example with a curved cross section, forming connecting paths between the differently executed fuel accommodating sections 17, 17$^1$, 17$^1$, 17$^3$ . . . in the middle section 3, preferably with rectangular, for example square, cross-sectional form. A square cross-sectional form is thus not necessary, and a rectangular cross-sectional form is just as good. Very often with at least two straight sides. Preferably at least three laterally 22 distributed tank sections are arranged in line next to one another and in at least two planes.

There is preferably also a number of longitudinal 6 recesses 18, 19 in the middle section 3, which are intended to accommodate a separate reinforcement 20 and/or for suspending the fuel tank 2. In conjunction with this, a number of internal and/or external hollow reinforcement ribs 18, 19 can be so arranged that they extend along the longitudinal extent 6 of the middle section for the purpose of accommodating an elongated reinforcing bar 24 of metal therein.

In order to achieve effective welding of the various components 3, 4, 5, the end pieces 4, 5 exhibit a cross section corresponding to that of the entire middle section.

The middle section 3 can consist of single piece, as in the example shown, although it can also consist of several separate middle section pieces which exhibit cross sections that are essentially identical to one another and are welded to one another.

All the partitions 7, 7$^1$ and bulkheads 9, 9$^1$ and the surrounding casing walls 21 are joined in areas which meet one another.

A process for manufacturing an arrangement 1 for a fuel tank 2 for heavy vehicles involves extruding a middle section 3, which consists of plastic or aluminium material with an at least essentially identical transcurrent cross section in the horizontal direction viewed in the longitudinal direction 6, and which exhibits internal partitions 7, 7$^1$ extending horizontally in the longitudinal direction 6 and bulkheads 9, 9$^2$ extending vertically across the aforementioned partitions 7, 7$^1$ in the longitudinal direction 6, and then cutting it to the desired length to fit the intended dimensions and volume of the intended fuel tank. The middle section 3 may alternatively be injection moulded.

The present invention permits the manufacture of fuel tanks in thermoplastic materials for heavy vehicles. The invention provides opportunities to reduce the required wall thicknesses to a value that is suitable for practical application in rational manufacturing, and the baffle function is achieved without the need for difficult execution.

When the tank is made of aluminium, not all the parts mentioned for plastic tanks are required. An extruded middle section is then closed at each end by a pressed aluminium end wall of the flat sheet type with a folded edge (jar lid without a thread). The end walls are welded to the middle section all the way round. At certain points where the end plate meets the internal wall terminations from the middle section, it is possible to weld from the outside by filling small holes in the end plate directly in front of these walls with weld. The connecting holes between the various compartments in the middle section are taken up in the termination of the partitions before welding the end plate.

The invention also comprises an entirely new execution of the suspension and reinforcement of the tank, which is made possible by the basic design of the tank cross section. The suspension can be integrated in this way with the tank itself in a manner which brings economies of weight, space, assembly time and cost.

Also injection moulded are pairs of end pieces 4, 5 constituting end walls, which essentially exhibit the same profile as the circumference 11 of the middle section and at least parts of the cross section 12 of the middle section, which form mutually opposing end pieces 4, 5, and a middle section 3 for welding together the respective ends 2A, 2B of the assembled fuel tank, and the partitions 13, 13$^1$, 14, 14$^1$ of which end pieces exhibit recesses 15, 16 forming connecting paths between the various formed sections 17, 17$^1$, 17$^2$, 17$^3$ . . . in the middle section 3 and are then welded together with the middle section 3. The end pieces are welded to the middle section. One end piece on each side. Welding takes place on suitable parts of the end pieces which meet the cross section of the middle section. The frame-forming outer part of the cross section of the middle section is fully welded to provide a fluid-tight execution. The optionally shaped recesses of the end pieces form connecting paths between the various sections 17, 17$^1$, 17$^2$ . . . in the middle section 3 when the end walls 4, 5 are placed in either end 3A, 3B.

A number of longitudinal 6 recesses 18, 19 formed as internal hollow reinforcement ribs are so arranged as to extend in the longitudinal direction of the middle section 3 and transversely 22 through the two end wall-forming end pieces 4, 5. A metal profile 24 is introduced into the aforementioned transcurrent channel 18 after welding together the various constituent parts 3, 4, 5 of the tank to form a combined reinforcement and a load spreader and preferably also a part of the means of suspension of the fuel tank 2. The question of the aforementioned reinforcement only arises when the tank 2 is made of a plastic material.

Function

The sectioned cross section enables absorption of the load to be distributed over several walls, each of which does not require to have the same thickness as it otherwise would. The thickness requirement is within that which can be used for series manufacture in extrusion and injection moulding.

Different sizes can be manufactured easily from the same moulding tool by subsequently adapting the length of the middle section before welding.

The shape of the connecting holes in the end wall components resolves the need for baffle plates without the need to apply vertical baffle plates. The longitudinal sectioning with narrowed connections in the end wall sections provides a baffle function in a way which is entirely different from the vertical baffle plates used previously, but which is possible through the design of the end walls and the middle section of the invention. The actual restriction of undesired dynamic mass forces can be made as effective as with vertical baffle plates, in spite of an entirely different solution. Mass movements in a lateral direction are also restricted effectively by the fact that the tank contains baffle plates in all directions.

Figure 5:
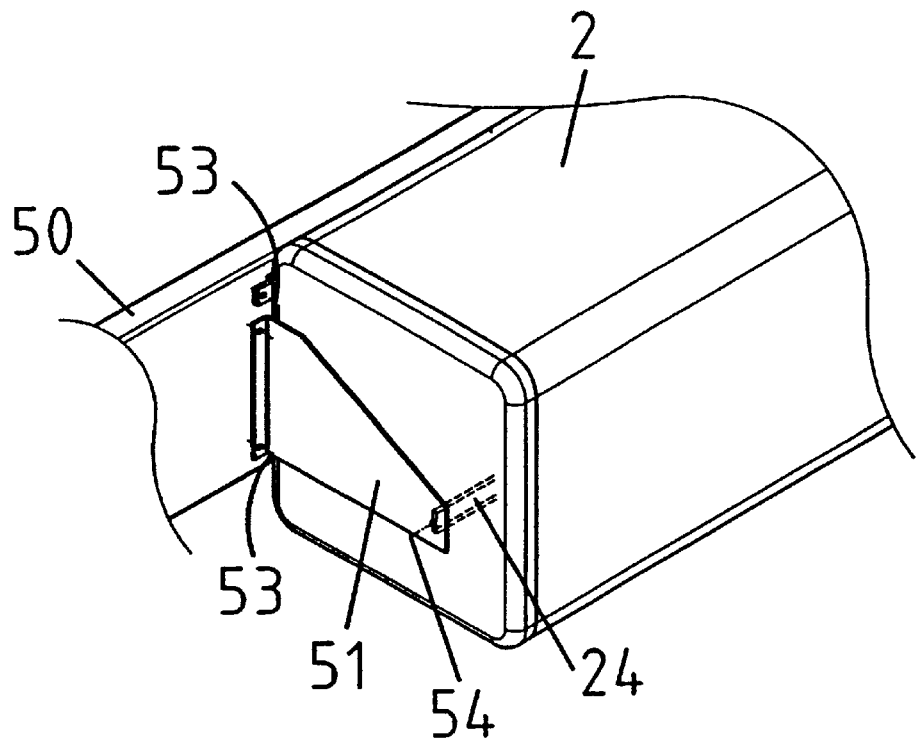
FIGS. 5 and 6 show the attachment of a tank to a chassis member and with an end support shown in perspective view and from one short end of the tank.
Figure 6:
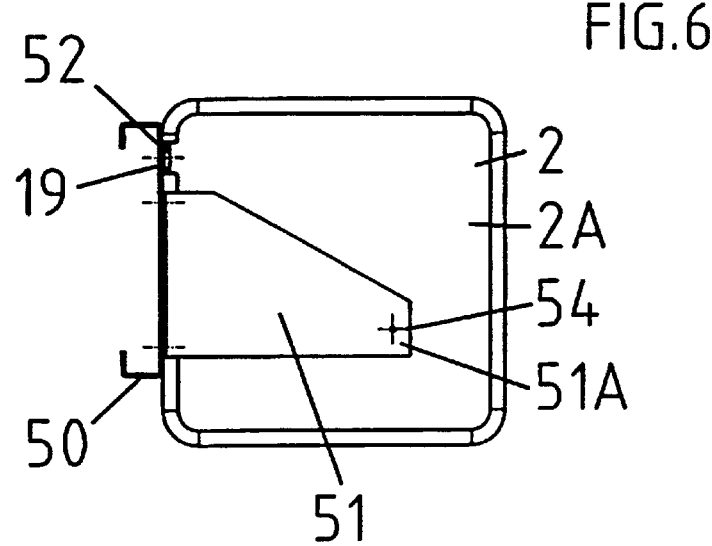

Illustrated in the drawings in FIGS. 5 and 6 is a tank 2 in accordance with the invention suspended from a vehicle chassis member 50 and with end wall lateral supports 5 on the respective short ends 2A of the tank. The tank 2 with its longitudinal recess 19 is slid onto a matching strip 52 on the chassis member 50, and the end wall supports 51 are screwed to the chassis member 50 perpendicularly to it by means of schematically represented bolts 53. By means of further bolts 54, a reinforcing bar 24, which is inserted into the tank 2 in the recess 18, is screwed securely to the end wall lateral supports 51, for example at their outer ends 51A.

Filling the tank with fuel and draining fuel from the tank can take place via holes, which can be arranged freely in a previously disclosed fashion or in some other way not indicated here. Since this is not essential for the invention, it is not illustrated in the drawings or described in more detail in the description.

The invention is not restricted to the illustrative embodiments described above and illustrated in the drawings, but may be varied within the scope of the Patent Claims without departing from the idea of invention.

What is claimed is:

1. Arrangement (1) for a fuel tank (2) for heavy vehicles, characterized in that a middle section (3) with an at least essentially identical transcurrent cross section in the horizontal direction viewed in the longitudinal direction (6), exhibits internal partitions (7, $7^1$) extending horizontally in the longitudinal direction (6) and bulkheads (9, $9^1$) extending across the partitions (7, $7^1$) in the longitudinal direction (6), in that pairs of end pieces (4, 5) forming end walls exhibit essentially the same profile as the circumference of the middle section and at least parts of the cross section (12) of the middle section as end pieces (4, 5) which meet one another and a middle section (3) for welding together at the respective ends (2A, 2B) of the assembled fuel tank, and in that the partitions (13, $13^1$, 14, $14^1$) of the end pieces exhibit recesses (15, 16) forming connecting paths between the various formed sections (17, $17^1$, $17^2$, $17^3$) in the middle section (3), in conjunction with which longitudinally extending recesses (18, 19) in the middle section (3) are provided for the purpose of receiving reinforcement (22) and for suspending the fuel tank;

the end pieces (4, 5) exhibit the cross section of the entire middle section (3);

wherein the longitudinally extending recesses are formed as internal hollow reinforcement ribs extending along the longitudinal extent (6) of the middle section for the purpose of accommodating an elongated reinforcing bar (24) of metal therein.

2. Arrangement in accordance with claim 1, characterized in that the middle section (3) consists of single piece.

3. Arrangement in accordance with claim 1, characterized in that the middle section consists of several middle section pieces which exhibit cross sections that are essentially identical to one another.

4. Arrangement in accordance with claim 1, characterized in that all the partitions (7, $7^1$) and bulkheads (9, $9^1$) and the surrounding casing walls (21) are joined in areas which meet one another.

5. Arrangement in accordance with claim 1, characterized in that at least three laterally distributed tank sections (17, $17^1$, $17^2$) are arranged in line next to one another and in at least two planes (23, $23^1$, $23^2$).

6. Arrangement in accordance with claim 1, characterized in that the formed tank sections have at least two essentially straight side walls and exhibit preferably rectangular cross-sectional form.

7. Arrangement in accordance with claim 1, characterized in that the partitions (13, $13^1$, 14, $14^1$) of the end pieces exhibit recesses (15, 16) forming the connecting paths between the various formed sections (17, $17^1$, $17^2$, $17^3$) in the middle section (3).

8. Process for the manufacture of an arrangement for a fuel tank for heavy vehicles in accordance with claim 1, characterized in that a middle section (3), with an at least essentially identical transcurrent cross section in the horizontal direction viewed in the longitudinal direction (6), and which exhibits internal partitions (7, $7^1$) extending across the aforementioned partitions (7, $7^1$) in the longitudinal direction, is extruded and is then cut to the desired length or is injection molded, and in that pairs of end pieces (4, 5) forming end walls, and which exhibit essentially the same profile as the circumference (11) of the middle section and at least parts of the cross section (12) of the middle section as end pieces (4, 5) which meet one another and a middle section (3) for welding together at the respective ends (2A, 2B) of the assembled fuel tank.

9. Process in accordance with claim 7, characterized in that the partitions (13, $13^1$, 14, $14^1$) of the end pieces, which exhibit recesses (15, 16) forming connecting paths between the various formed sections (17, $17^1$, $17^2$, $17^3$, $17^4$) in the middle section (3), are injection moulded and are then welded together with the middle section (3).

10. Process in accordance with Patent claim 7, characterized in that said longitudinal recesses are so arranged as to extend in the longitudinal direction (6) of the middle section (3) and transversely through the two end wall-forming end pieces (4, 5), and in that a metal profile (24) is introduced into the transcurrent channel after welding together the various constituent parts (3, 4, 5) of the tank to form a combined reinforcement, a load spreader and a part of the means of suspension of the fuel tank.

11. Arrangement in accordance with claim 1 wherein the middle section is made from a material selected from the group consisting of plastic and aluminum.

12. A fuel tank for heavy vehicles, comprising:

a middle section:
said middle section comprising at least two internal partitions extending horizontally in the longitudinal direction and at least two internal bulkheads extending across the partitions,
at least two hollow reinforcement ribs extend longitudinally in the horizontal direction for the purpose of accommodating an elongated reinforcing bar; and
a pair of end pieces forming endwalls, said endwalls exhibit essentially the same profile as the circumference of the middle section,
said end pieces exhibit endwall partitions and endwall bulkheads;
said internal partitions and bulkheads cooperate with said endwall partitions and bulkheads to form a plurality of fuel accommodating sections; and
said endwall partitions exhibit recesses to form connecting paths between the fuel accommodating sections;
wherein the fuel tank is oriented horizontally and is suspended using at least one of said hollow reinforcement ribs when installed on a vehicle.

13. Arrangement in accordance with claim 12, characterized in that the middle section consists of single piece.

14. Arrangement in accordance with claim 12, characterized in that all the partitions and bulkheads and surrounding casing walls are joined in areas which meet one another.

15. The fuel tank of claim 12, wherein the middle section is made of a material selected from the group consisting of plastic and aluminum.

16. The fuel tank of claim 12, wherein the fuel accommodating sections have a rectangular or square cross-section.

17. The fuel tank of claim 12, wherein the recesses have a curved cross section.

* * * * *